(12) United States Patent
Nett et al.

(10) Patent No.: US 7,819,771 B2
(45) Date of Patent: *Oct. 26, 2010

(54) ASYMMETRICAL, ACTIVE AXLE TRANSMISSION

(75) Inventors: Hans-Peter Nett, Adenau (DE); Bernd Oberhausen, Wegberg (DE)

(73) Assignee: GETRAG Driveline Systems GmbH, Cologne (DE)

( * ) Notice: Subject to any disclaimer, the term of this patent is extended or adjusted under 35 U.S.C. 154(b) by 635 days.

This patent is subject to a terminal disclaimer.

(21) Appl. No.: 11/788,927

(22) Filed: Apr. 23, 2007

(65) Prior Publication Data

US 2008/0039265 A1   Feb. 14, 2008

(30) Foreign Application Priority Data

Apr. 21, 2006 (DE) .................. 10 2006 019 131

(51) Int. Cl.
*F16H 37/08* (2006.01)

(52) U.S. Cl. .................................... 475/204
(58) Field of Classification Search ............ None
See application file for complete search history.

(56) References Cited

U.S. PATENT DOCUMENTS

| | | | | |
|---|---|---|---|---|
| 5,415,598 A | * | 5/1995 | Sawase et al. ............ | 475/86 |
| 5,893,812 A | | 4/1999 | Narai et al. | |
| 6,120,407 A | | 9/2000 | Mimura | |
| 6,805,651 B2 | * | 10/2004 | Lipman .................. | 475/221 |
| 7,044,880 B2 | * | 5/2006 | Bowen ................... | 475/205 |
| 7,520,833 B2 | * | 4/2009 | Honda et al. ............ | 475/248 |
| 2008/0153652 A1 | * | 6/2008 | Nett et al. ............... | 475/207 |

FOREIGN PATENT DOCUMENTS

| | | |
|---|---|---|
| DE | 693 01 434 D | 3/1996 |
| DE | 601 03 064 T2 | 1/2005 |
| EP | 0 063 432 A1 | 10/1982 |
| FR | 2864190 | 6/2005 |
| JP | 11315905 | 11/1999 |

* cited by examiner

*Primary Examiner*—Dirk Wright
(74) *Attorney, Agent, or Firm*—Stetina Brunda Garred & Brucker

(57) ABSTRACT

The invention relates to an asymmetrical, active axle transmission with an epicyclic gear system, which is arranged concentrically to a side shaft (7) and has a planet carrier (17). To achieve an active yaw function, the planet carrier (17) or the central wheel (13) can be braked.

Figure 1:
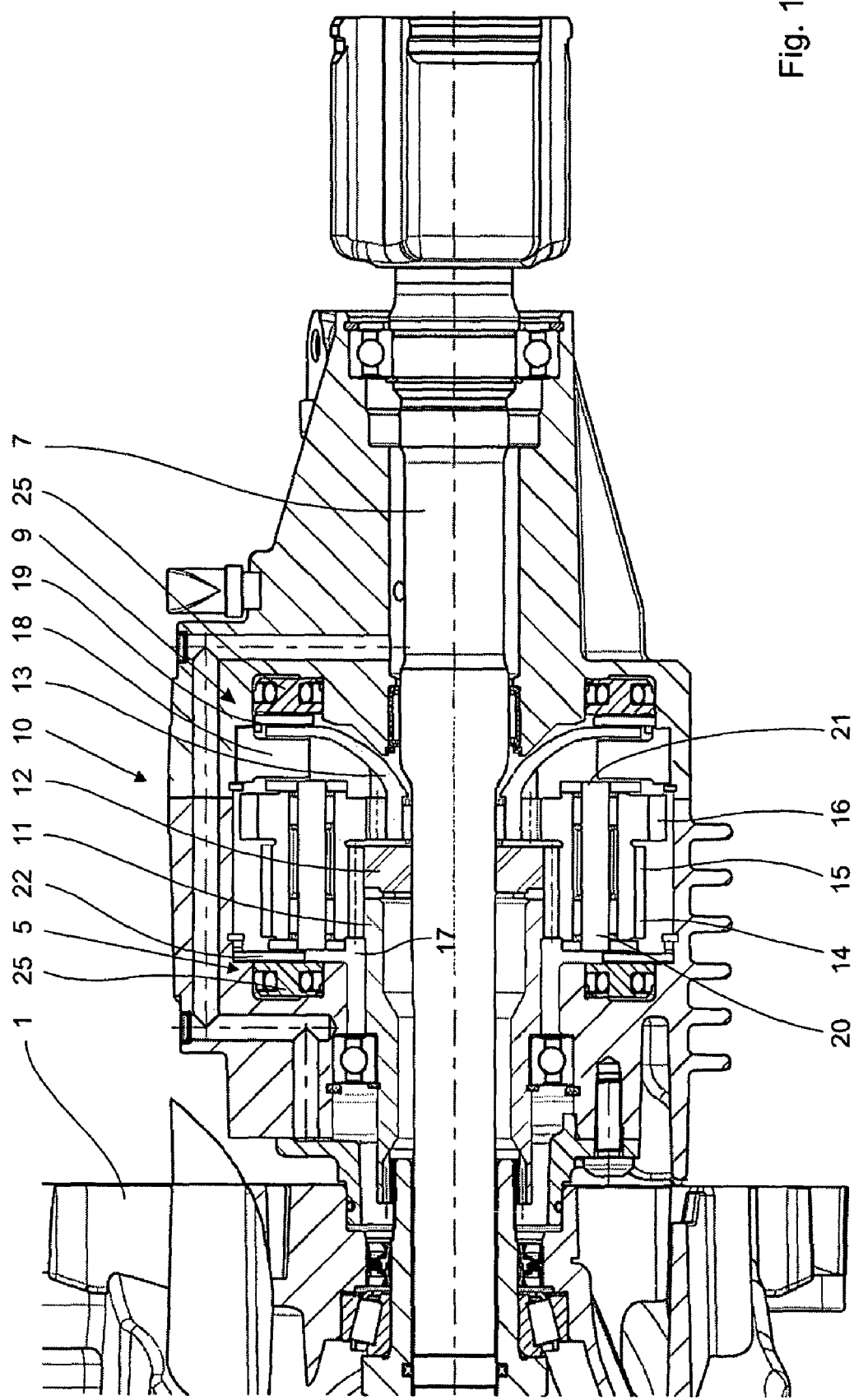

Conventional asymmetrical active yaw gears use in this connection two separate brake clutches. This enlarges the construction space and increases the manufacturing costs which the invention avoids in that the planet carrier (17) is part of a first brake coupling (5) and that a second brake clutch (9) for braking the side shaft (7) as well as the first brake clutch (5) use a common abutment lamella (19).

13 Claims, 4 Drawing Sheets

ASYMMETRICAL, ACTIVE AXLE TRANSMISSION

The invention relates to an asymmetrical active axle transmission for cooperating with a differential arranged in a differential housing with
- a transmission case,
- a side shaft arranged in said transmission case which is able to transfer a drive torque provided by the differential to an output drive,
- a shiftable epicyclic gear system arranged in said transmission case, having a planet carrier with planet wheels, which are provided with an external tooth system and are meshed with a second central wheel which is connected torque proof with the side shaft, a third central wheel which can be braked relative to the transmission case over a second brake clutch which can be shifted via an actuator and a first central wheel coupled with said differential housing, wherein said planet carrier can be indirectly or directly braked over a first brake clutch which can be shifted via an actuator relative to said transmission case.

Such axle gears are used in driving dynamics control. A preferred application area thereby is the driving dynamics control of a vehicle, whereby the application of the invention is not limited to this. Passive locks were initially used in connection with passenger car axle gears, which operated the basis of the number of revolutions, respectively, torque differences between the wheels, in the recent years increasingly active locks are used.

Passive locks are, for example, torque-sensing Torsen-differentials or the rotation speed sensing Visco coupling. These systems are generally known, however they have the disadvantage that the driving dynamics control cannot actively affect the locking torque. Within the scope of the increasing use of active driving dynamic controls, an active lock is increasingly used therefore which can be influenced by control. This has the advantage on the one hand that the so-called interference torques of passive locking systems can be suppressed and on the other hand, the advantage that the driving dynamics control specifically can procure through the activation of the locking a yaw moment on the vehicle to positively influence driving performance.

In particular, when cornering it is meanwhile possible to produce a yaw moment which supports the cornering through actuation of locks. In this connection so-called active yaw systems are used. Such an active yaw system is known from US 006120407A. Here a symmetrical and an asymmetrical system are described in which the term symmetry is based on the differential of the motor drive. An asymmetrical active yaw system thus exhibits an active locking system on a side of the differential which can be influenced over the vehicle dynamic control system.

Through the active-yaw system a torque is specifically assigned to the individual driving wheels so that due to the different wheel tangential forces the yaw moment is produced on the vehicle vertical axle.

Substantial constructional requirements of such an axle transmission are in addition to the provision of the necessary functions, the minimization of the construction space as well as the minimization of the weight of the transmission. Furthermore, the costs of component parts, of course, have to be held kept low.

Fundamentally, a distinction is made in vehicle construction between a driven and a non-driven axle, whereby both axles can be equipped with an active axle transmission. In the case of non-driven, so-called hang-on axle, relatively small axle thrusts are present so that the mechanical load of the differential and the axle transmission are kept correspondingly low. The driven primary drive axles, in contrast, have to transfer the motor torque to the drive wheels so that here a greater constructional effort is necessary. The essential area of application of generic axle transmissions therefore is also the use in connection with primary drive axles or with all-wheel drives with central differential.

Figure 3:
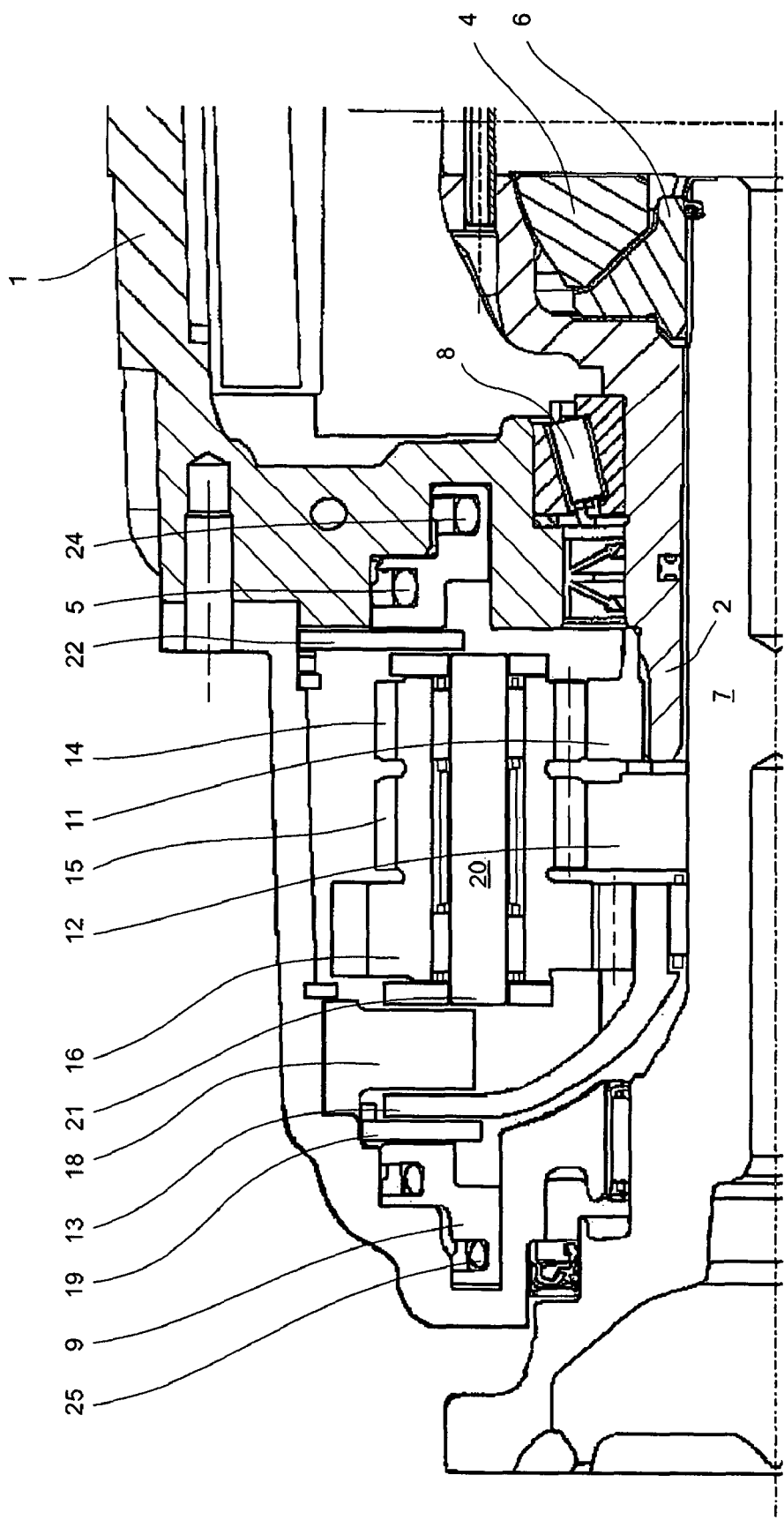

The asymmetrical axle transmission known from US 00612047 A, in particular, FIG. 3 requires an additional coupling for the fixation of the central wheel. Furthermore, this axle system formed as a so-called shaft-shaft-principle so that inside the transmission case significantly large numbers of revolutions arise in the planet set, which in turn increases the constructional effort and the necessary production precision.

Furthermore, a so-called Honda SH Active Yaw System is known from the company, Honda, in which over a first planet differential the torque distribution between the front and rear axle can be varied. The final torque distribution to the individual rear wheels is controlled then via two further planet differentials whose sun wheels can be braked over electromagnetically operative multiple disk clutches.

Therefore, the object of the invention is to develop an active yaw transmission as wear-resistant active yaw transmission as possible with low constructional complexity.

This object is accordingly solved by the invention by the fact that the planet carrier is arranged between a counter bearing disk and a first brake disk which is axially moveable, wherein the first brake clutch by applying an operating force is capable of reducing the distance between the abutment lamella and the first brake lamella to generate a braking force.

Through the embodiment of the asymmetrical axle transmission according to the invention, the transmission speed and the power dissipation of the transmission can now be kept low with small constructional complexity. At the same time, a further transmission on the opposite side of the differential is no longer required due to the asymmetrical arrangement and the braking, respectively, accelerating function of the transmission.

Preferably, the transmission has a variable planet with two or three tooth systems in which on the side shaft the central wheel connected with the side shaft is arranged. In addition to this second central wheel a further central wheel is provided which is coupled with the differential housing. Both central planet wheels are meshed with a plurality of planet wheels respectively in common which are arranged over the breath of the side shaft.

The planet wheels can have different partial diameters for engagement with the first and second planet wheel so that the planet wheel has two gears of different dimensions on the same arm. Alternatively, the first and second planet wheel can also have the same tooth geometry as well as the same diameter so that a gear ratio between the second central wheel connected torque proof with the side shaft and the first central wheel coupled with the differential housing is realised only over different numbers of teeth on exactly these central wheels. Profile offset is utilized in this case in order to maintain the engagement conditions. This transmission enables the necessary acceleration, respectively, delay of the side shaft by fixation of the planet carrier through the first brake clutch.

The first tooth system of the planet wheel and the second tooth system can also be formed by a common gear-like section of the planet wheel of the planet wheel. The same also applies for the third tooth system of the planet wheel which together with the other two tooth systems is arranged on an arm which is connected via an arm bearing with the planet carrier of the epicyclic gear system.

The third tooth system meshes with a third central wheel. This third central wheel is held load-centered in the epicyclic gear system. A bearing opposite the side shaft is not necessary, may be provided, however, optionally.

The third central wheel has a gear-like section with which it is held in the planetary gearbox. In axial direction a flange-like outwardly extending area is joined hereto, whose outer edges are formed as brake disks. The second brake clutch, which is able to clamp this brake disk-like area of the third central wheel between two friction lamellas as a result of the pressure force of the second operating piston and is arranged fixed to the transmission case, can brake the third central wheel in this manner.

The operating piston substantially corresponds to the prior art, it concerns preferably a hydraulic working piston which as a result of an applied force is able to position the second brake lamella at the third central wheel in the region of the friction surface. In order to realize a brake effect, the third central wheel is supported axially shiftable so that together with the friction lamella it can be pressed against a support lamella.

The invention saves constructional effort in that the first brake clutch and the second brake clutch effect a common abutment lamella wherein the brake clutches are arranged respectively on one of the two sides of the support lamella.

The first brake clutch presses the first friction lamella against the planet carrier and thus the axially shiftable planet carrier against the abutment lamella. The abutment lamella in turn is axially supported in the transmission case. The second brake clutch presses in turn, as already described above, the second brake lamella against the outer region of the third central wheel and therefore the axially shiftable third central wheel in turn against the abutment lamella.

On the basis of the constructional design, the advantage arises that the rotational speed difference of the rotating arm of the planetary gear system can be captured directly over the friction clutch. Thus, no additional axial bearing is required in the planet carrier. This saves not only construction space but also allows for a cost advantage. The same applies for the integration of the planet carrier in the friction clutch.

Further, a power transmission from the transmission case to the planet wheel is not necessary since the planet wheel itself is part of the friction clutch. Thus, a further component is also saved in this way. The rotational speed difference between the rotating center wheel and the transmission case can also be directly absorbed here by the friction clutch so that further axial bearings are also superfluous here. Through the significant reduction of the number of the necessary bearings, the power dissipation can be reduced whereby the overall efficiency of the transmission is increased.

The transmission according to the invention can be used both in connection with primary drive axles as well as with secondary drive axles. The axle housing can accommodate the entire transmission so that the transmission case then represents the axle housing. Alternatively, the active axle transmission can also be arranged in a separate transmission case, whereby then the mechanical coupling between the differential housing and the first planet occurs via component which is to be led out of the transmission case which is connected to the differential housing. The interface to the differential housing is through the shaft-piston principle identical to the interface of a conventional distributor case or a cross lock, as they are usual with all-wheel drives.

In particular, through the development of the axle transmission as shaft-basket principle solution the number of revolutions in the planetary gear can be reduced which in turn enables the profile offset a particularly simple and economic realization of the necessary translation possible.

Further features and advantages of the invention develop from the sub-claims and from the following description of preferred embodiments on the basis of the drawings.

Figure 2:
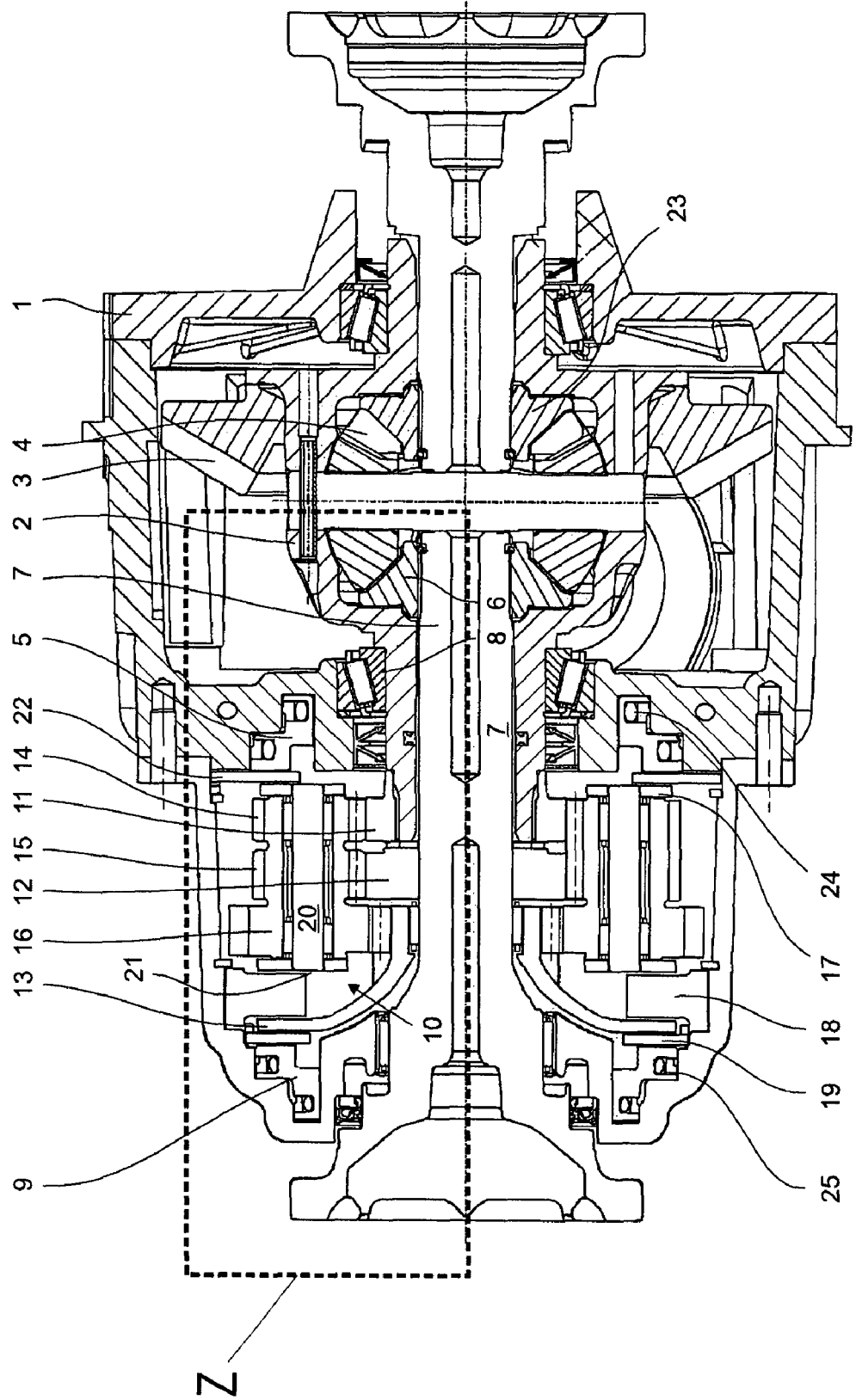
Figure 4:
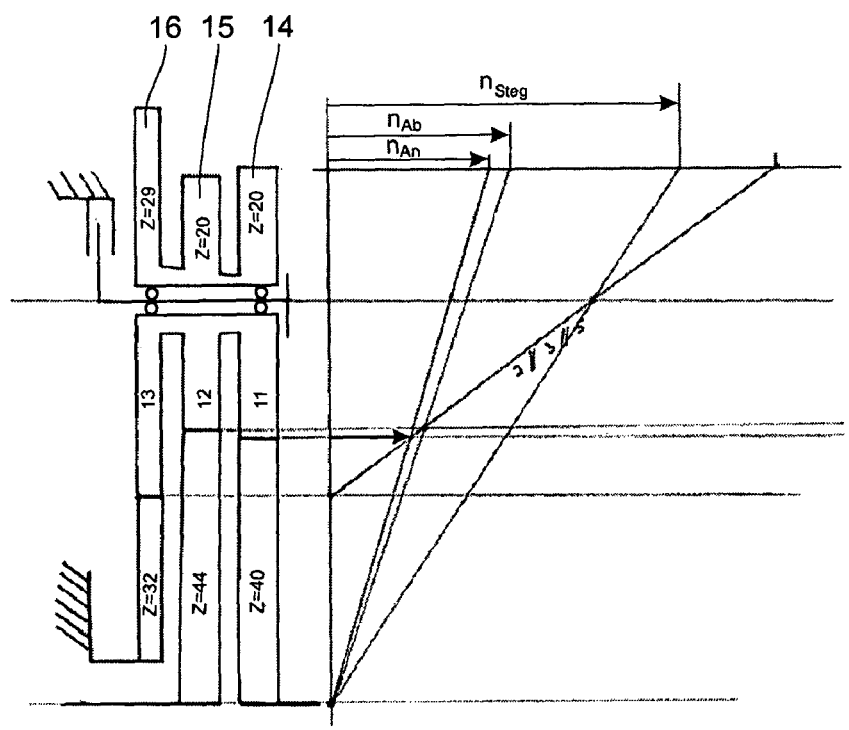
Figure 5:
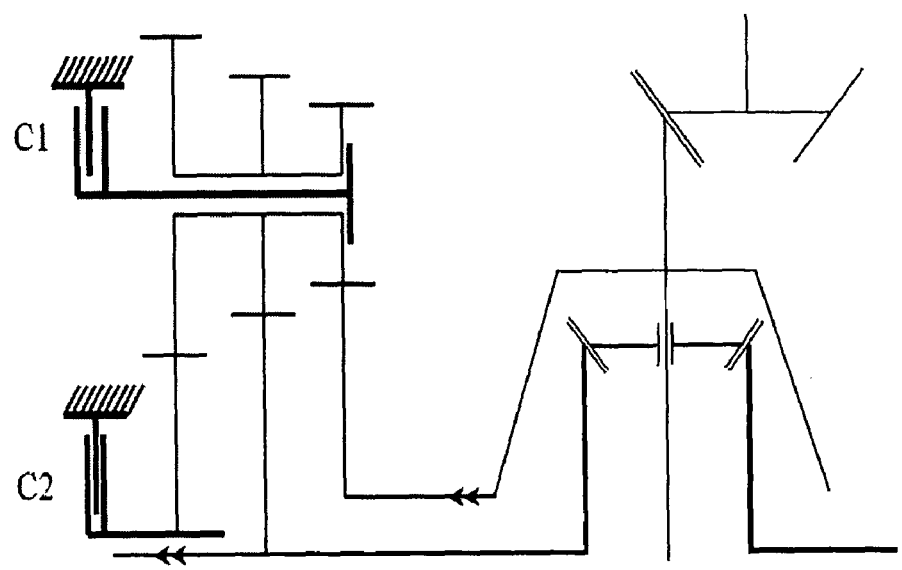

In the drawings:

FIG. 1 shows an active asymmetrical axle transmission with independent transmission case in section, FIG. 2 an active asymmetrical axle transmission with arrangement in the axle housing, FIG. 3 detail Z from FIG. 2, FIG. 4 the plan of the number of revolutions of the axle transmission represented in FIG. 2 and FIG. 5 the schematic representation of the axle transmission shown in FIG. 2.

In FIG. 1 an active yaw axle transmission according to the invention is represented. In an axle housing 1 a differential housing 2 is supported which forms a torque proof unit with crown wheel 3. A differential 23 is provided in the axle housing for the distribution of a driving power on side shaft 7. The differential 23 is arranged in a differential housing 2 which in turn is arranged in axle housing 1. The differential housing 2 is rotationally supported in the axle housing 1 over a main bearing 8 of the axle transmission.

In the embodiment illustrated, the active axle transmission is arranged to the left next to the differential. This is substantially formed by the epicyclic gear system 10 designed as a planetary gear system, wherein this epicyclic gear system 10 has planetary gears which are meshed several times next to each other.

A first tooth system 14 of the planetary gear is engaged with a first central wheel 11 coupled with the differential housing. Torque proof to the first tooth system 14, the planet wheel has a second tooth system 15 and a third tooth system 16, wherein the third tooth system 16 is meshed with a third central wheel 13 which can be braked and the second tooth system 15 is meshed with a second central wheel 12 connected torque proof with side shaft 7. Over the active axle transmission an active yaw function is now realized.

A side wheel 6 of the differential is connected torque-proof over a tooth system with the side shaft 7. The side shaft 7 drives in turn the second central wheel 12 coupled with it which transfers the driving power on the second tooth system 15 of the planet wheel of the epicyclic gear system 10. The planetary gears wheels are held via pin 20 and a bearing arm 21 in planet carrier 17.

During normal driving without control operation the wheel epicyclic gear system 10 rotates as a block with the differential 23. If an active yaw function is now demanded during cornering over the driving dynamics control, either the planet carrier 17 of the epicyclic gear system 10 or the breakable third central wheel 13 can be braked.

If the planet carrier 17 of the epicyclic gear transmission 10 is braked or even fixed, the side shaft will rotate more slowly than the differential housing 2. In this case, the second central wheel 12 which is coupled with the side shaft transfers the driving power of the planet carrier 17 directly to the planet wheel which in turn transfers the power with the same gear transmission ratio on the first central wheel 11 coupled with the differential housing.

If, on the other hand, the breakable third central wheel 13 is braked or even fixed, the side shaft 7 rotates faster than the differential housing 2. Due to the action of the differential 23 a reverse effect will respectively occur on the opposite side of the axle drive. If the left side shaft 7 is accelerated, the right side shaft is braked, respectively, during braking of the left side shaft 7, the right side shaft is accelerated. In this way a control operation occurs over the differential on both sides. Over tire slip the wheel tangential force of the respectively faster revolving wheel then increases so that over the vehicle vertical axis a positive yaw or shear moment can be generated for the better turning in of the vehicle in curves.

The active yaw function is realized over the effective diameter ratio of the first tooth system 14 to the second tooth system 15. For this in the simplest but rather complicated manufacturing case, a different number of teeth can be selected. Alternatively, the number of teeth of both tooth systems, as shown here, can be the same, wherein then over a profile offset the necessary gear transmission can be realized between the second gear wheel 2 coupled with side shaft 7 and the first gear wheel 11 coupled with the differential housing 2.

As can be seen from the revolution number plan shown in FIG. 4, a preferred combination of the tooth systems shows, for example, as first tooth system 14 and second tooth system 15 respectively a number of teeth of 20 teeth pro gear while the second gear wheel 12 coupled with the side shaft 7 has here 44 and the first gear 11 coupled with the differential housing 2 has here 40 teeth. The diameter difference resulting from this is sufficient for the transmission function.

For deceleration of the brakable third central wheel 13 or the planet carrier 17 of the epicyclic gear system 10 a first braking clutch 5 and a second brake clutch 9 is provided. The second brake clutch 5 acts on the planet carrier 17 of the epicyclic gear system 10. In the usual application range only one of the two brake clutches 5 or 9 will be operated.

If both brake clutches 5, 9 were operated, then the vehicle would be braked, wherein a complete braking of the vehicle would require an appropriate dimensioning of components, which would make the axle transmission unnecessarily difficult. Fundamentally it would also be possible, however, to achieve a braking effect over a double braking within the axle transmission over the first brake clutch 9 and the second brake clutch 5.

The second brake clutch 9 becomes the braking mechanism over a second operating piston 25. This second operating piston 25 has a contact surface which is pressed against a second brake lamella 19 by the operation of the control piston 25. This second brake lamella 19 in turn as a result of this pressure is employed against the third brakable central wheel 13 on opposite lying side of which in turn an abutment lamella 18 is arranged. The operating force of the second operating piston 25 therefore causes that the outer region of the brakable third central wheel 13 is clamped and thus is braked between the abutment lamella 18 and the second brake lamella 19.

The first friction lamella 18 has a double function in this connection. On the one hand, it ensures the above represented brake function for the brakable central wheel 13 over a left frictional surface. On the other hand, it is the abutment for the braking of the planet carrier 17. For realizing the brake function, the planet carrier 17 has two contact surfaces, against which the friction lamellas can be pressed. In this way, the planet carrier 17 itself is part of the brake clutch. The planet wheels are supported on arm 20 which are connected with the planet carrier 17 over the arm support.

The planet carrier 17 is braked over a first operation piston 24 which is arranged to the right next to the planet carrier 17 in the embodiment represented. This first operating piston 24 presses in turn with an operative surface against a first brake lamella 22 which is supported axially displaceable in the differential housing.

The first brake lamella 22 can be employed over the operative force of the first operating piston 24 against an active surface on the planet carrier 17 of the epicyclic gear system 10. The planet carrier 17 has on the side turned away from the planet wheels a corresponding active surface which is connected via a pin with the first active surface, wherein the planet wheel is supported on the pin. In the embodiment illustrated the planet wheel is executed in one piece with three gear teeth, namely the first tooth system 14, the second tooth system 15 and the third tooth system 16. Naturally, single wheels can also be employed here which, however, have to be connected torque proof with one another. The active surface of the planet carrier 17 in turn opposed to the first operating piston 24 is used in turn as a result of the axial shiftability of the planet carrier 17 by the occurrence of an operating force against the right active surface of the abutment lamella 18. Thus, the friction lamella 18 fulfils a double function since it acts respectively as the brake lamella for the first brake clutch 5 and for the second brake clutch 9.

The brakable third central wheel 13 is supported axially on the side shaft 7, wherein as a result of the load-centered arrangement of the third central wheel 13 such a support would actually not be necessary. Over the tooth system with the planet wheel the gear wheel 13 would also be adequately held without additional support between side shaft 7 and gear wheel 13.

The abutment lamella 18 is supported over a securing ring in axial direction in the direction of the planet carrier 17 so that a friction force as a result of the actuation of the second operating piston 25 during the function of the second brake coupling 9 cannot be transferred to the planet carrier 17. Such an axial setting can of course be realised through a multitude of construction designs, in particular, a housing form. The abutment lamella 18, the second brake lamella 19 as well as the first brake lamella 22 are connected over carry-on gearings with the axle housing 1.

The axial shiftability of the brakable central wheel 13 is restricted by the friction lamella 18 and 19 since the abutment lamella 18 in the housing is held in axial direction. A resetting spring pushes the second brake lamella back to the original position after activation of the second operating piston 25 so that the free wheeling between the central wheel 13 and the friction lamella can stop again.

In principle, two possible designs of the axle gear are conceivable. On the one hand, the design represented in FIG. 1 with its own transmission case and, on the other hand, in the arrangement inside of the axle housing, wherein the latter arrangement yields, of course, a very compact construction form with low cost and effort. On the other hand, this design must find consideration during construction of the axle housing, therefore will be particularly preferred in new constructions.

The transmission ratio of the epicyclic gear system 10 should be selected in such a way that a surplus number of revolutions are present in narrow curve radii at the outer cornering wheel. Friction effects should be kept fundamentally as small as possible since this concerns power loss in this connection. In order to reduce the effect of friction, too large a difference in the number of revolutions should not be selected. A difference as small as possible in the gear transmission ratio should be selected.

LIST OF REFERENCE NUMBERS

1. Axle housing
2. Differential housing
3. Crown gear
4. Compensation differential
5. First brake clutch 6. Side wheel of compensation differential
7. Side shaft
8. Main bearing of axle gear
9. Second brake clutch
10. Epicyclic gear system (planetary gear system)
11. First central wheel coupled with differential housing
12. Side shaft
13. Brakable third central wheel
14. First tooth system of planet wheel of epicyclic gear system
15. Second tooth system of planet wheel epicyclic gear system
16. Third tooth system of planet wheel of epicyclic gear system
17. Planet carrier of epicyclic gear system
18. Abutment lamella
19. Second brake lamella
20. Arm of epicyclic gear system
21. Support arm
22. First brake lamella
23. Differential
24. First operating piston
25. Second operating piston

The invention claimed is:

1. An asymmetrical, active axle gear for cooperating with a differential (23) arranged in a differential housing (2), comprising
a transmission case
a side shaft (7) arranged in said transmission case, which is able to transfer a drive torque provided by said differential (23) to an output drive,
a shiftable epicyclic gear system (10) arranged in said transmission case having a planet carrier (17) with planet wheels which are provided with an external tooth system and are meshed with a second central wheel (12) connected torque proof with said side shaft (7), a third central wheel (13) which, can be braked relative to said transmission case, over a second brake clutch (5) which can be shifted via an actuator and a first central wheel coupled with said differential housing (2),
wherein said planet carrier (17) can be indirectly or directly braked relative to said transmission case over a first brake clutch (5) which can be shifted via an actuator, characterized in that
said planet carrier (17) is arranged between an abutment lamella (18) and a first brake lamella (22) which is arranged axially moveable relative to said abutment lamella (18), wherein said first brake clutch (5) by applying an operative force is capable of reducing the distance between said abutment lamella (18) and said first brake lamella (22) to generate a brake force.

2. The asymmetrical, active axle transmission according to claim 1, characterized in that said transmission case is an axle housing (1) of a vehicle in which said differential (2) is arranged.

3. The asymmetrical, active axle transmission according to claim 1, characterized in that said transmission case is a separate case from said axle housing (1) of a vehicle, wherein said first central wheel is connected with said differential housing (2) over a torque proof connection.

4. The asymmetrical, active axle transmission according to claim 1, characterized in that said third central wheel (13) is supported axially movable and extends with a friction area between said abutment lamella (18) and a second brake lamella (19), axially moveable relative to said support lamella (18), wherein said second brake clutch (9) by applying an operative force is capable of reducing the distance between said abutment lamella (18) and said second brake lamella (19) to generate a brake force.

5. The asymmetrical, active axle transmission according to claim 1, characterized in that said abutment lamella (18) is axially supported in said transmission case.

6. The asymmetrical, active axle transmission according to claim 1 or claim 4, characterized in that said breakable third central wheel (13) has a hollow cylindrical first region and a second region adjacent to the first region extending flange-like outwardly, wherein said first region is formed as a toothed gear wheel with implemented side shaft (7) and said second region has said friction region.

7. The asymmetrical, active axle transmission according to claim 6 or claim 4 or claim 1, characterized in that said brakable third central wheel (13) is held load-centered by the planet wheels.

8. The asymmetrical, active axle transmission according to claim 1 or claim 4, characterized in that between said brakable third central wheel (13) and said side shaft (7) an additional radial bearing is arranged.

9. The asymmetrical, active axle transmission according to claim 1, characterized in that said first tooth system (14) and said second tooth system (15) have an identical number of teeth and an identical diameter, wherein said central wheel (12) coupled with said side shaft (7) and said central wheel (11) coupled with said differential housing (2) have a different number of teeth with the same diameter and the engagement is realized via a profile offset.

10. The asymmetrical, active axle transmission according to the preceding claim, characterized in that said central wheel (12) coupled with said side shaft (7) has less teeth than the central wheel (11) coupled with said differential housing (2).

11. The asymmetrical, active axle transmission according to claim 10, characterized in that said central wheel (12) coupled with said side shaft (7) has more teeth than said central wheel (11) coupled with said differential housing (2).

12. The asymmetrical, active axle transmission according to claim 10 or claim 11, characterized in that said planet carrier (17) is held load-centered by said first central wheel (11) and said second central wheel (12).

13. The asymmetrical, active axle transmission according to claim 12 or claim 11, characterized in that the tooth system of said central wheel (12) coupled with said side shaft (7) and said central wheel (11) coupled with said differential housing (2) are selected such that in response to the activity "braking effect on said planet carrier (17) or on said third central wheel (13)" a gear transmission ratio error between −10% and 10% occurs.

* * * * *